Patented May 9, 1933

1,908,544

UNITED STATES PATENT OFFICE

GEORGE ETHELBERT SANDERS AND ALBERT ERNEST WALLER, OF BROOKLYN, NEW YORK

METHOD OF COLORING LEAD ARSENATE GREEN AND PRODUCT

No Drawing. Application filed April 2, 1929. Serial No. 352,045.

The object of this invention is a method of coloring lead arsenate green. In the spraying and dusting of ornamental plants it is often desirable that the spray or the poison used be green in color so as not to be noticable or to disfigure the foliage. In addition white insecticides often attract aphids to plants whereas green insecticides being the same color as the foliage do not so attract them. In order therefore to make lead arsenate more desirable for certain purposes, we have devised the following method of coloring it green.

To 1680 lbs. of litharge in suspension in water add 150 lbs. of nitric acid (36 Beaumé) follow this with 20 lbs of sodium dichromate. To this add 1380 lbs. of arsenic acid (61% AS 205). After reaction between the litharge and the arsenic acid has taken place add 15 lbs. of ferri ferro cyanide (Prussian blue). The yield on a dry basis will be around 2585 lbs. of dry green lead arsenate.

This formula is merely one example of many that may be used in attaining the same end, that is, producing a green lead arsenate by mixing a chromium salt of lead with ferri ferro cyanide in the presence of a precipitate of lead arsenate.

Various changes and modifications may be made without departing from the spirit of the invention. For instance: the proportions of litharge and arsenic acid may be varied. Acetic acid may be substituted in whole or in part for the nitric acid. The sodium dichromate may be added after instead of before the arsenic acid. Other salts of chromium such as sodium chromate, potassium chromate, potassium dichromate, lead chromate or lead dichromate may be substituted for sodium dichromate. Lead arsenate in paste form or dry lead arsenate pulped up in water may be the starting point. The ferri ferro cyanide may be in water soluble or in water insoluble form. Varying proportions of the chromium salt and ferri ferro cyanide may be used depending on the depth of color desired. Various other changes and modifications may be made without departing from the spirit of the invention which consists essentially in mixing a chromium salt of lead with ferri ferro cyanide in the presence of a precipitate of lead arsenate to form a green colored lead arsenate.

We claim and desire to secure by Letters Patent in the United States of America

1. An insecticidal composition containing the reaction product of litharge, nitric acid, an alkali dichromate, and arsenic acid, the reaction product comprising an arsenic compound containing lead and chromium.

2. An insecticide containing Prussian blue and products formed by reacting a lead compound, an acid, an arsenic acid to form lead hydrogen arsenate and reacting the lead hydrogen arsenate with a water soluble chromate to form a lead chromium arsenic compound, the Prussian blue and lead chromium arsenic compound cooperating to produce a green color.

3. Method of making a green colored insecticide which comprises reacting a water soluble chromate with lead hydrogen arsenate so that some of the lead hydrogen arsenate is converted into a lead chromium arsenic compound and adding ferri ferro cyanide so that the lead chromium arsenic compound formed and the ferri ferro cyanide cooperate to produce a green-colored insecticide having increased fungicidal and adhesive properties and without an appreciable increase in water solubility.

Signed at New York, in the county of New York and State of New York, this twenty-sixth day of March A. D. 1929.

GEORGE ETHELBERT SANDERS.
ALBERT ERNEST WALLER.